May 1, 1951 W. VAN B. ROBERTS 2,551,337
IMPEDANCE MEASURING
Filed July 29, 1948

INVENTOR
WALTER VAN B. ROBERTS
BY
ATTORNEY

Patented May 1, 1951

2,551,337

UNITED STATES PATENT OFFICE 2,551,337

IMPEDANCE MEASURING

Walter van B. Roberts, Princeton, N. J., assignor to Radio Corporation of America, a corporation of Delaware Application July 29, 1948, Serial No. 41,332

9 Claims. (Cl. 175—183)

This invention relates to improvements in the art of impedance measuring, and has for its principal object the provision of improved methods and devices for measuring directly the quality factor and the reactance of impedances.

Another object of the invention is to provide an improved impedance measuring device in which the adjustments of the variable elements are independent of each other.

A further object is to provide impedance measuring device which requires no complicated shielding between the parts.

Another object is to provide an improved impedance measuring device which is of simple construction and which is adapted for easy, rapid use.

A further object is to provide improved methods and devices for determining the loss angle of magnetic cores, and wherein such factors as the resistance of test windings are not involved.

While not limited thereto, the methods of the invention may be practiced by means of a circuit including a vario-coupler used in conjunction with a variable phase-shifter, where a vario-coupler will be understood to mean a pair of windings or inductances having variable mutual inductance therebetween. The impedance to be measured is connected in circuit with the phase shifter and the vario-coupler in such a manner that (1) the phase shifter can be adjusted to match the phase angle of the impedance, and (2) the vario-coupler can be adjusted to give the magnitude of the reactive component of the impedance.

A more complete understanding of the invention may be had by reference to the following description of an illustrative embodiment thereof, when read in connection with the accompanying drawing in which.

Figure 1:
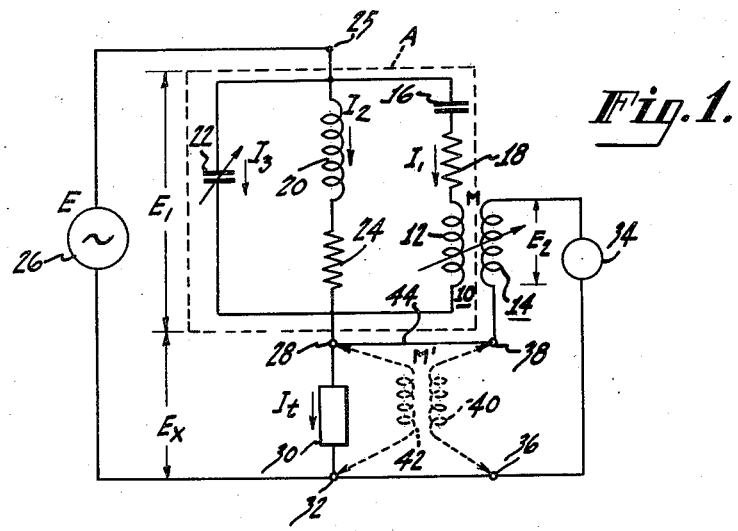
Figure 1 shows a circuit arranged in accordance with my invention.

Referring to Figure 1, a circuit illustrating the invention may include a vario-coupler 10 having a primary winding 12 and a secondary winding 14. The primary winding 12 forms part of a series circuit which also includes a capacitor 16, and a resistor 18 (the resistor 18 being composed, at least in part, of the resistance of the winding 12). The capacitor 16 and the winding 12 are tuned approximately to series resonance.

An inductance 20 and a variable capacitor 22 are each connected in parallel with the series resonant circuit of the primary winding 12, and together form a phase-shifting circuit as will be described. A resistor 24, shown as being in series with the inductance 20, is actually only representative of the resistance of the inductance 20. For convenience, the three-branch circuit which has just been described, and which is shown within the broken-line block A, will hereinafter be referred to as circuit A.

The circuit A is connected to one terminal 25 of a source of alternating voltage 26, while an unknown impedance 30 may be connected between the circuit A and the voltage source 26 at terminals 28, 32 provided for that purpose.

The secondary winding 14 of the vario-coupler 10 is connected in a detector circuit which includes a detecting device 34, such as a radio receiver or any other suitable detecting means, and a pair of terminals 36 and 38 which may be used to connect one of the coils 40 of a pair of calibrating coils 40, 42 into the circuit. During normal use of the device, the secondary circuit may be connected in series with the impedance 30 by a lead 44 between the terminals 28 and 38, or, if the device is being used to measure the loss angle of magnetic core material, the lead 44 may be removed, and coils 40 and 42 (wound on the material to be investigated) may be connected in the circuit as shown by the dotted lines.

Figure 2:
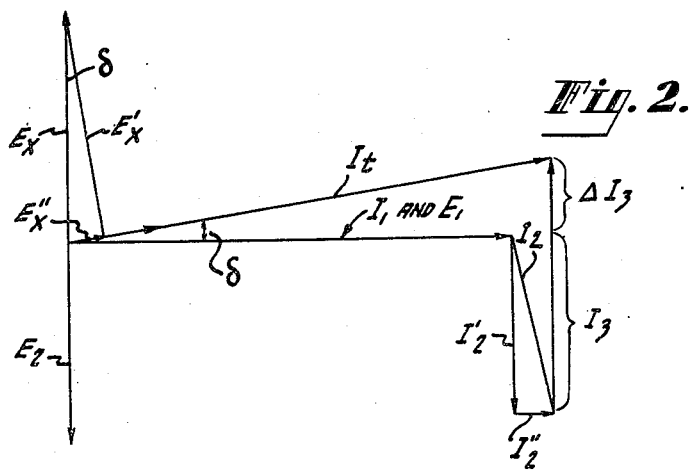
Figure 2 is a vector diagram showing the phase relations between the currents and voltages in the circuit of Figure 1.

Referring to the vector diagram of Figure 2, the operation of the circuit of Figure 1 may be explained as follows:

The current $I_t$ which will flow through the unknown impedance 30 will be the vector sum of the three branch currents $I_1$, $I_2$, and $I_3$ in the circuit A of Figure 1. Since the primary winding 12 is in series resonance with the capacitor 16, the current $I_1$ through the winding 12 will be a purely resistive current and will be in phase with the voltage $E_1$ across the circuit A. The current $I_2$ through the inductance 20 and the resistance 24 will consist of a reactive component $I_2'$ which will lag the voltage $E_1$ by 90°, and a small resistive component $I_2''$ which will be in phase with the voltage $E_1$. The current $I_3$ through the capacitor 16 will lead the voltage $E_1$ by substantially 90°, and may be adjusted (by varying the capacitor 22) to exceed the current $I_2'$ by an amount $\Delta I_3$, as is shown vectorially in Figure 2. The amount $\Delta I_3$ by which the current $I_3$ should exceed the current $I_2$ will be specified presently.

It is apparent that the total current $I_t$ from the circuit A will flow through the impedance 30, and will produce a voltage drop $E_x$ across the impedance 30 which will be the resultant of a resistive component $E_x''$, which will be in phase with the current $I_t$, and a reactive component $E_x'$ which will lead the current $I_t$ by 90°. The resultant voltage $E_x$ will lead the current $I_t$ by an angle $(90-\delta)°$ where $\delta$ is the phase angle effect of the impedance 30. It can be seen that if the amount $\Delta I_3$ by which the current $I_3$ exceeds the current $I_2$ is such that the current $I_t$ leads the current $I_1$ by an angle $\delta$, then the voltage $E_x$ will lead the current $I_1$ by exactly 90°. Since the voltage $E_2$ induced in the secondary winding 14 will lag the inducing current $I_1$ by exactly 90°, the two voltages $E_2$ and $E_x$ acting on the secondary circuit can be balanced in magnitude by adjusting the variable mutual inductance M to produce a current null in the detector 34. When the circuit has been balanced in this manner, then (1) $\quad (R_x + j\omega L_x)(\sigma + a + j\omega \Delta C) - j\omega M = 0$ where $R_x$ = the resistive component of the impedance 30
$L_x$ = the reactive component of the impedance 30
$\omega$ = the frequency of the voltage from the source 26
$\sigma$ = the conductance of the resistor 18
$a$ = the conductance of the branch including the inductance 20 and the resistor 24
$\Delta C$ = the change in capacity of the capacitor 22 from an initial value $C_0$ ($C_0$ being the capacity necessary to balance the susceptance of the branch including the inductance 22 and the resistance 24)
$M$ = the mutual inductance of the vario-coupler 10

The real and imaginary parts of Equation 1 give, respectively, (2) $\quad \dfrac{R_x}{\omega L_x} = \dfrac{\omega \Delta C}{\sigma + \alpha} = \dfrac{1}{Q}$ (where Q is the quality factor of the impedance 30) and (3) $\quad L_x = \dfrac{\sigma}{\sigma + \alpha} M - \dfrac{R_x \Delta C}{\sigma + \alpha}$ In practice, the conductance $a$ is usually very much smaller than the conductance $\sigma$; and when the phase angle $\delta$ of the impedance 30 is small, the factor $$\dfrac{R_x \Delta C}{\sigma + \alpha}$$

is negligible. Therefore, sufficient accuracy is usually obtained by using the expressions (4) $\quad \dfrac{1}{Q} = \dfrac{\omega \Delta C}{\sigma}$ and (5) $\quad L_x = M$ If Q is small, however, it may be desirable to use the complete expressions (2) and (3) for maximum accuracy.

The initial adjustment of the circuit of Figure 1 may be made as follows:

With the lead 44 removed from the terminals 28 and 38, a pair of air-core coupled coils 40 and 42 are connected, respectively, to the terminals 36, 38 and to the terminals 28, 32. With this arrangement, a purely reactive voltage $I_t j\omega M'$ will be induced in the coil 40, with a phase angle $\delta = 0$, and the capacitor 16 is then adjusted to make the currents $I_t$ and $I_1$ correspond in phase. The resultant setting of the capacitor 16 may be taken as the value $C_0$, from which subsequent changes $\Delta C$ can be determined as the circuit is used to measure different impedances. Moreover, the same general arrangement can be used to measure the loss angle of core material in the following manner:

A pair of coils, such as the coils 40, 42, may be wound on the sample of material being investigated. In general, "single turn" coils may be used with excellent results. In this, the "impedance" being measured is actually the "resistive" and "reactive" effect of the core material, and the voltage induced in the coil 40 will have a phase angle $\delta$ which is dependent on the losses in the core being tested, and is substantially independent of ohmic losses in the windings 40, 42. Hence, the capacitor 16 can be adjusted to achieve a balanced condition in the detector circuit, and the change in capacity $\Delta C$ will give a direct measure of the loss angle of the core, with no consideration being required of the resistance of the windings 40, 42 or other similar factors of confusion.

While any type of vario-coupler may be used to provide the variable mutual inductance M, a wave guide attenuator type is believed to be preferable, since a single point of known inductance or mutual inductance suffices to calibrate M for a wide range of adjustment. An arrangement of this general type is shown in Terman's Radio Engineer's Handbook (first edition) at page 981.

While the operation of the circuit of Figure 1 has been described for an inductive impedance, it will be obvious that the same measurements may be made with capacitive impedances, provided the inductance 20 has sufficient admittance to permit negative values of $\Delta C$ to be selected. Furthermore, the capacitor 22 may be fixed rather than variable, with the inductance 20 being made variable. In general, it may be found preferable to use a variable capacitor 22, as values of $\Delta C$ may be tabulated readily in terms of dial readings, thus permitting Q values, or tan $\delta$ values, to be calculated and marked directly on the dial. All that is necessary is that the total reactance of the inductance 20 and the capacitor 22 can be varied.

Since many changes could be made in the circuit shown and described, all within the scope and spirit of my invention, the foregoing is to be construed as illustrative, and not in a limiting sense.

What is claimed is:

1. In a device for measuring an impedance, a pair of input terminals adapted to be connected to a source of alternating voltage, means for deriving from said source (1) a first current which is in phase with said voltage, (2) a second current which leads said voltage by substantially 90°, and (3) a third current which lags said voltage by substantially 90°, means for adjusting the relative magnitudes of said second and third currents, means for passing the resultant of said currents through said impedance, a detector circuit, means for coupling into said detector circuit (1) a voltage of magnitude and phase determined by the passage of said resultant current through said impedance and (2) a voltage which is substantially 90° out of phase with said first current, means for adjusting the relative magnitudes of the voltages in said detector circuit, and means for detecting a voltage null in said detector circuit.

2. In a device of the type described, in combination, a vario-coupler having a primary winding and a secondary winding, a pair of input terminals adapted to be connected to a source of voltage, a series resonant circuit including said primary winding, means for connecting an impedance in circuit with said resonant circuit across said input terminals, a circuit in parallel with said resonant circuit for shifting the phase of the current through said impedance with respect to the current through said resonant circuit, a secondary circuit including (1) said secondary winding and (2) means for detecting current flow in said secondary circuit, and means for supplying the voltage across said impedance to said detecting circuit.

3. In a device of the type described, in combination, a vario-coupler having a primary winding and a secondary winding, a pair of input terminals adapted to be connected to a source of voltage, a series resonant circuit including said primary winding, means for connecting an impedance in circuit with said resonant circuit across said input terminals, a capacitor and an inductance connected in parallel with said resonant circuit, means for varying the total reactance of said capacitor and said inductance, a secondary circuit including (1) said secondary winding and (2) means for detecting current flow in said secondary circuit, and means for supplying the voltage across said impedance to said detecting circuit.

4. In a device of the type described, in combination, a vario-coupler having a primary winding and a secondary winding, a pair of input terminals adapted to be connected to a source of alternating voltage, a series resonant circuit in parallel with said input terminals and including said primary winding, means for connecting an impedance in series with said resonant circuit and one of said input terminals, means in parallel with said resonant circuit for shifting the phase of the current through said impedance with respect to the current through said resonant circuit, and a secondary circuit including (1) said secondary winding, (2) means for detecting current flow in said secondary circuit, and (3) means for supplying the voltage across said impedance to said detecting circuit.

5. In a device of the type described, in combination, a vario-coupler having a primary winding and a secondary winding, a pair of input terminals adapted to be connected to a source of voltage, a series resonant circuit including said primary winding, means for connecting an impedance in series with said resonant circuit across said input terminals, a variable capacitor and an inductance connected in parallel with said resonant circuit, a secondary circuit including (1) said secondary winding and (2) means for detecting current flow in said secondary circuit, and means for supplying the voltage across said impedance to said detecting circuit.

6. The method of measuring the phase angle and the reactance of an impedance, which method comprises the steps of developing three currents in such phase relation that the first of said currents leads the second by substantially 90° and lags the third by substantially 90°, adjusting the relative magnitudes of said second and third currents so that the phase angle of the resultant of said three currents with respect to said first current is equal to the phase angle of said impedance, deriving a voltage from said first current, and balancing said derived voltage against a voltage derived by passing said resultant current through said impedance.

7. The method of measuring the phase angle and the reactance of an impedance, which method comprises the steps of developing three currents in such phase relation that the first of said currents leads the second by substantially 90°, and lags the third by substantially 90°, adjusting the relative magnitudes of said currents to adjust the phase angle of the resultant of said currents with respect to said first current, and balancing a voltage derived from one of said three currents against a voltage derived by passing said resultant current through said impedance.

8. The method of determining the loss angle of a paramagnetic core which method comprises the steps of developing three currents in such phase relation that the first of said currents leads the second by substantially 90° and lags the third by substantially 90°, deriving from the resultant of said three currents a voltage whose magnitude and phase are dependant on the characteristics of said paramagnetic core, and balancing said derived voltage against a voltage developed from one of said three currents.

9. The method of determining the loss angle of a paramagnetic core which method comprises the steps of developing three currents in such phase relation that the first of said currents leads the second by substantially 90° and lags the third by substantially 90°, adjusting the relative magnitudes of said currents to adjust the phase angle of the resultant of said currents with respect to said first current, deriving from said resultant current a voltage whose magnitude and phase are dependant on the characteristics of said paramagnetic core, and balancing said derived voltage against a voltage developed from one of said three currents.

WALTER van B. ROBERTS.

REFERENCES CITED

The following references are of record in the file of this patent:

UNITED STATES PATENTS

| Number | Name | Date |
| --- | --- | --- |
| 1,588,539 | Fortescue | June 15, 1926 |
| 2,046,704 | Slonczewski | July 7, 1936 |
| 2,302,230 | Livingston | Nov. 17, 1942 |
| 2,319,475 | Quayle | May 18, 1943 |

FOREIGN PATENTS

| Number | Country | Date |
| --- | --- | --- |
| 246,963 | Great Britain | Feb. 11, 1926 |